United States Patent [19]
Gillem

[11] 3,779,407
[45] Dec. 18, 1973

[54] VEHICLE LIFTING AND TOWING APPARATUS

[75] Inventor: Luke D. Gillem, Orinda, Calif.

[73] Assignee: Roger W. McCoy, Piedmont, Calif.; a part interest

[22] Filed: May 24, 1971

[21] Appl. No.: 146,294

[52] U.S. Cl. ............................ 214/86 A, 280/406 A
[51] Int. Cl. .............................................. B60p 3/12
[58] Field of Search ................. 214/86 A; 280/406 A

[56] References Cited
UNITED STATES PATENTS

| | | | |
|---|---|---|---|
| 2,937,772 | 5/1960 | Sullivan | 214/86 A |
| 2,553,229 | 5/1951 | Barhorst | 214/86 A |
| 3,154,205 | 10/1964 | Gillem | 214/86 A |
| 3,490,627 | 1/1970 | Goldstrom, Jr. | 214/86 A |
| 2,426,513 | 8/1947 | Linn | 267/58 |
| 3,520,556 | 7/1970 | Warner | 280/406 A |
| 3,600,004 | 8/1971 | Newkirk | 280/406 A |
| 3,510,016 | 5/1970 | Wolff et al. | 214/86 A |

*Primary Examiner*—Albert J. Makay
*Attorney*—Warren, Rubin, Brucker and Chickering

[57] ABSTRACT

An apparatus for lifting one end of a disabled vehicle and for coupling it to a towing vehicle in which the apparatus itself comprises a wheel supported carriage for assuming the majority of the load of the disabled vehicle and being constructed and connected to the towing vehicle in a manner permitting a relatively light weight towing vehicle to lift and tow a relatively heavy weight disabled vehicle.

6 Claims, 11 Drawing Figures

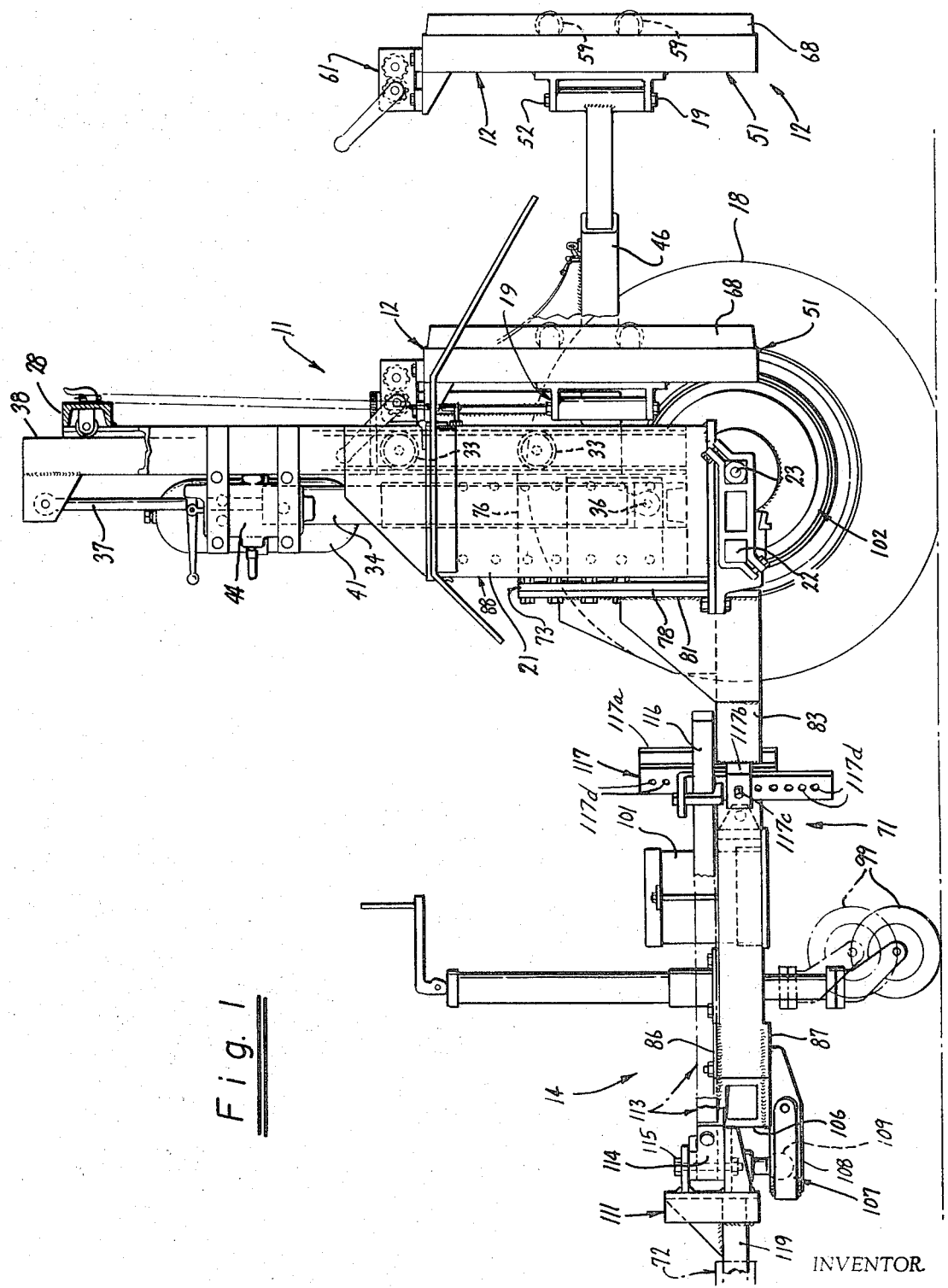

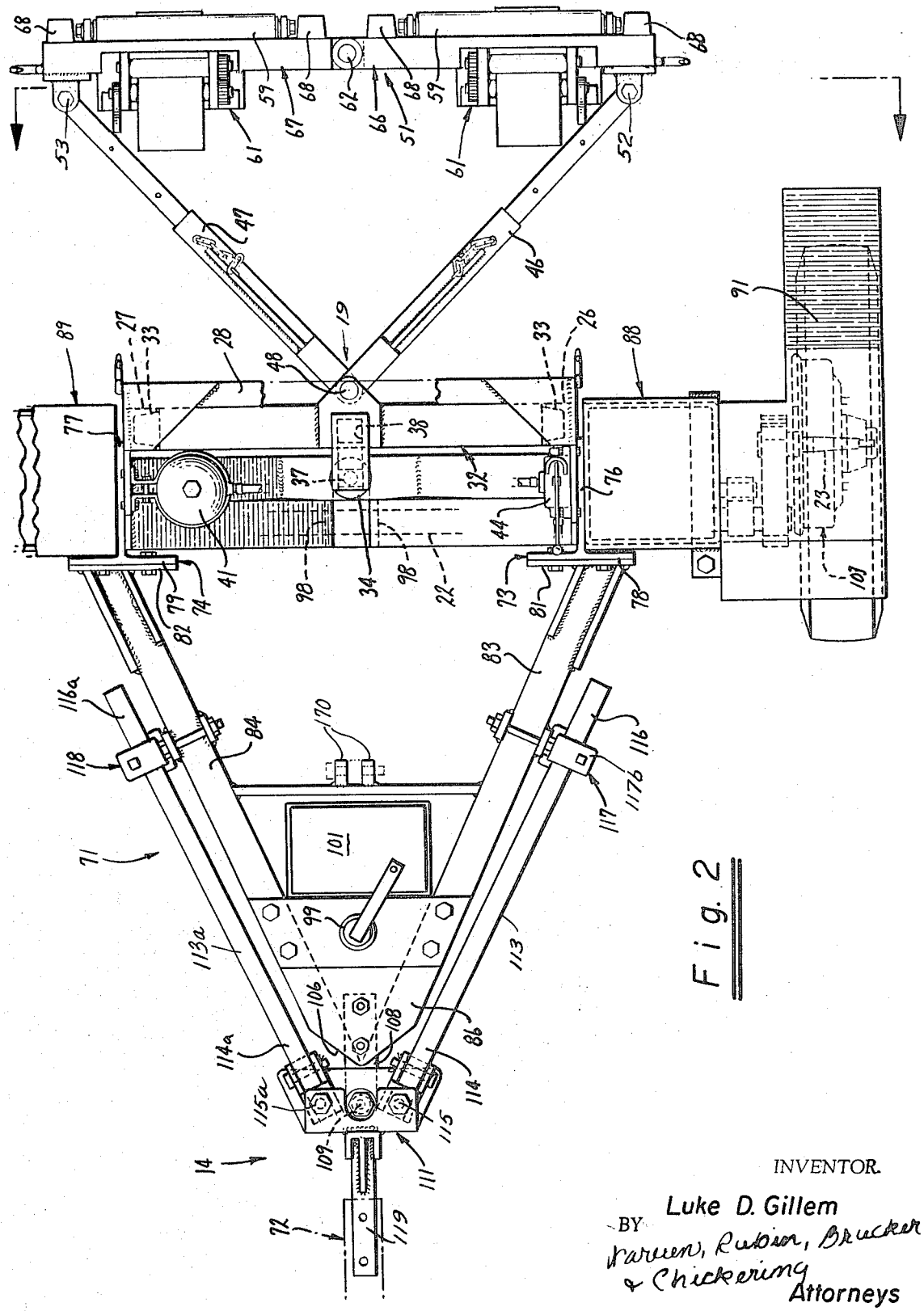

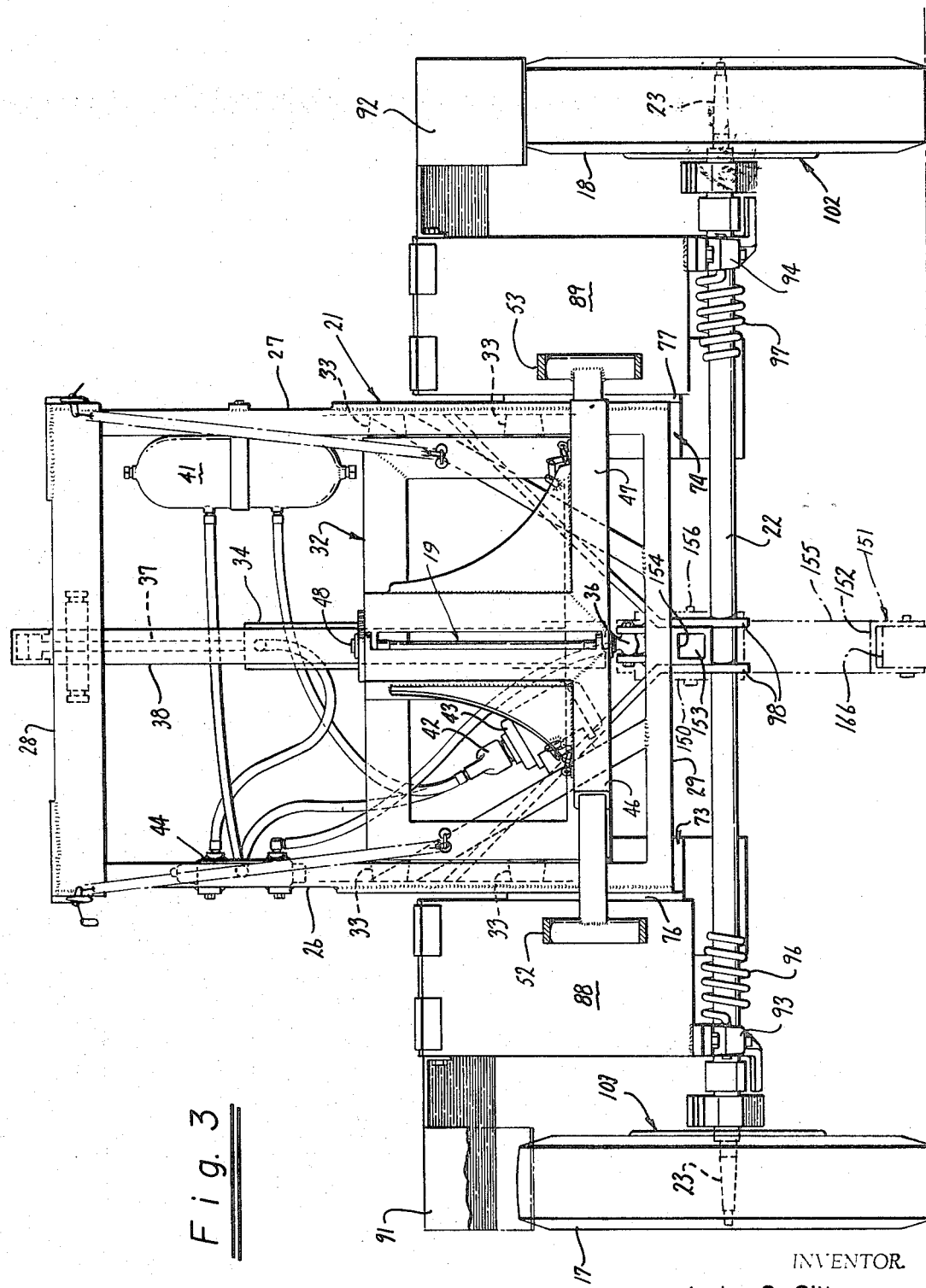

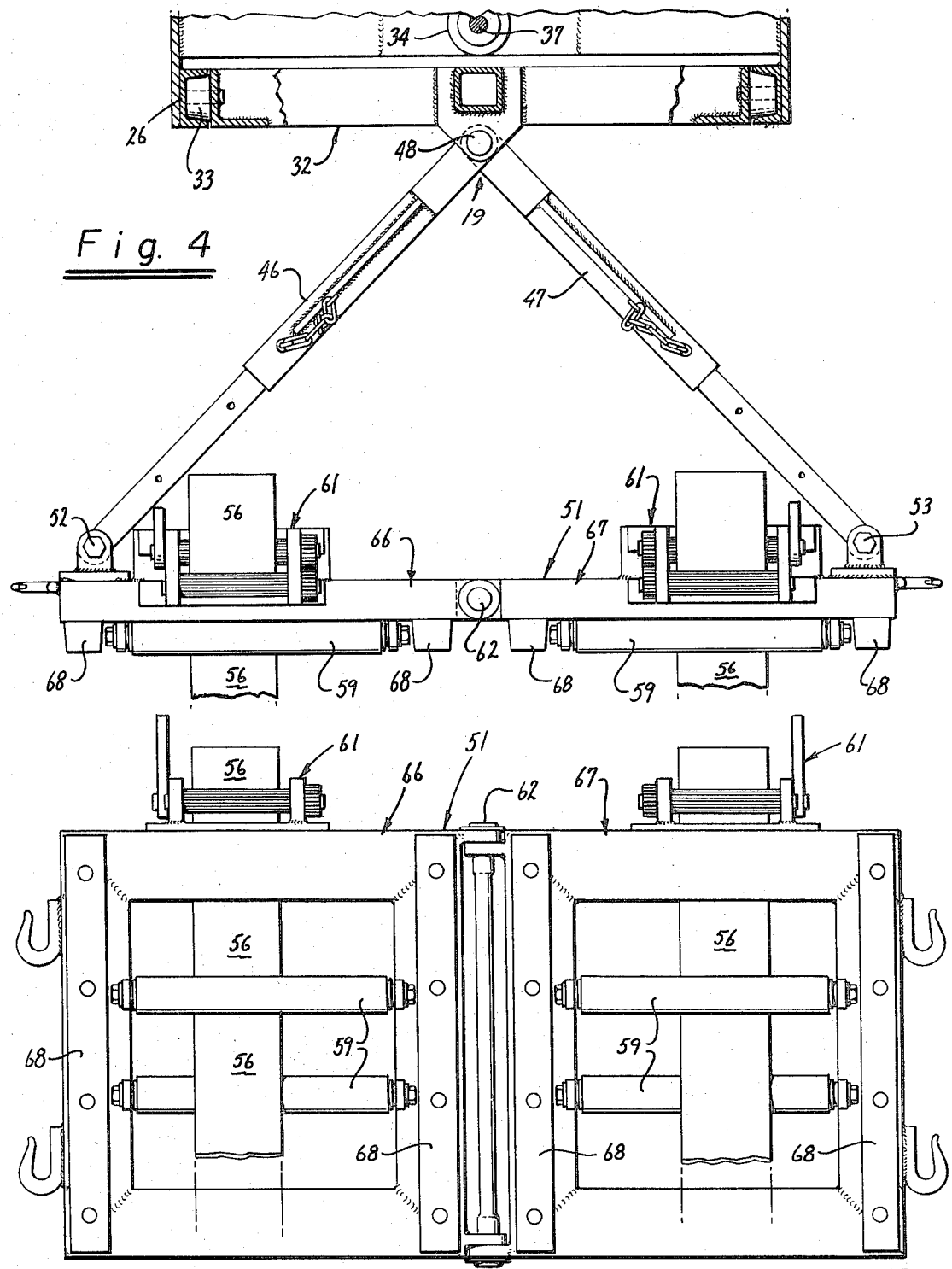

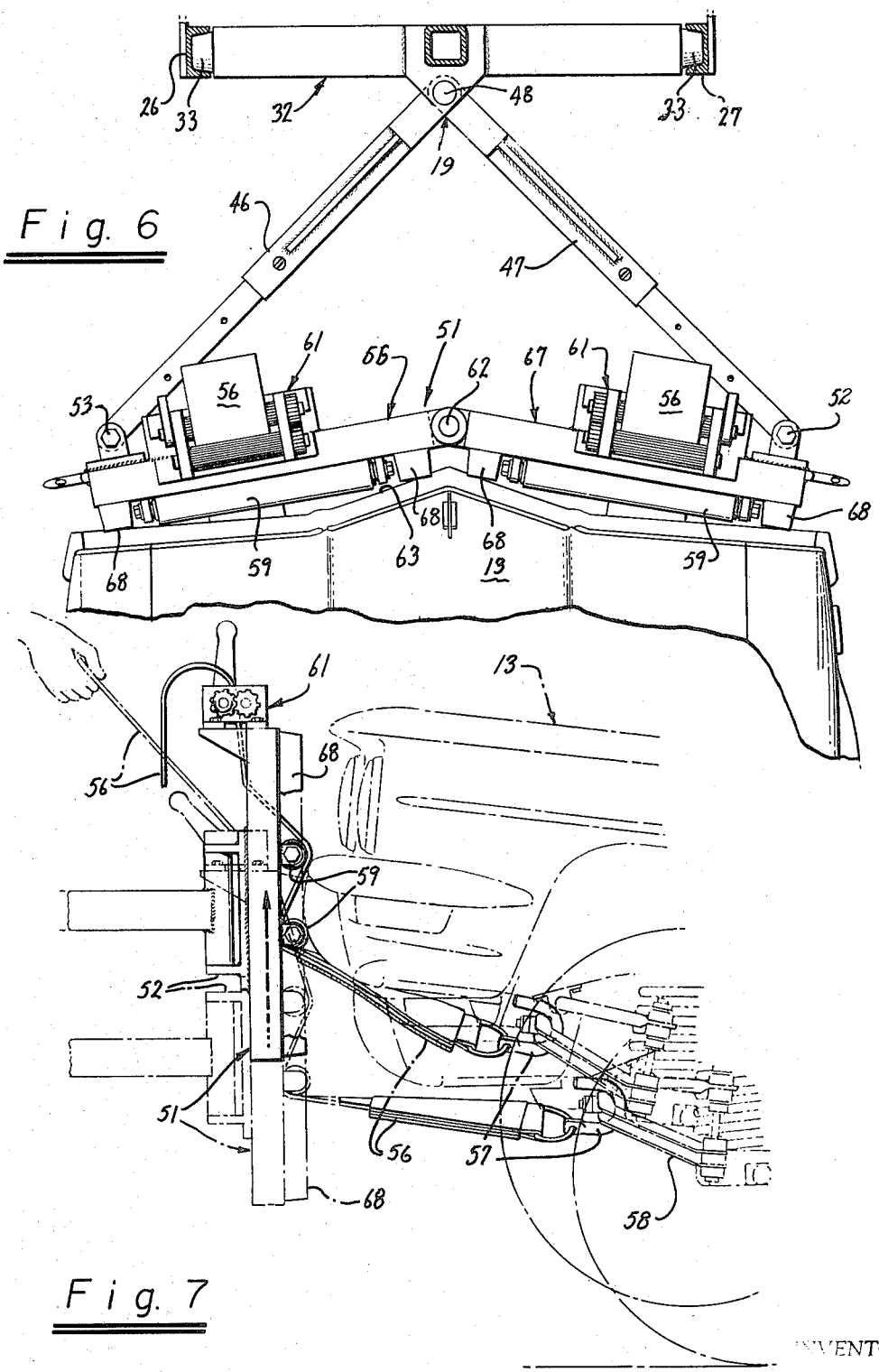

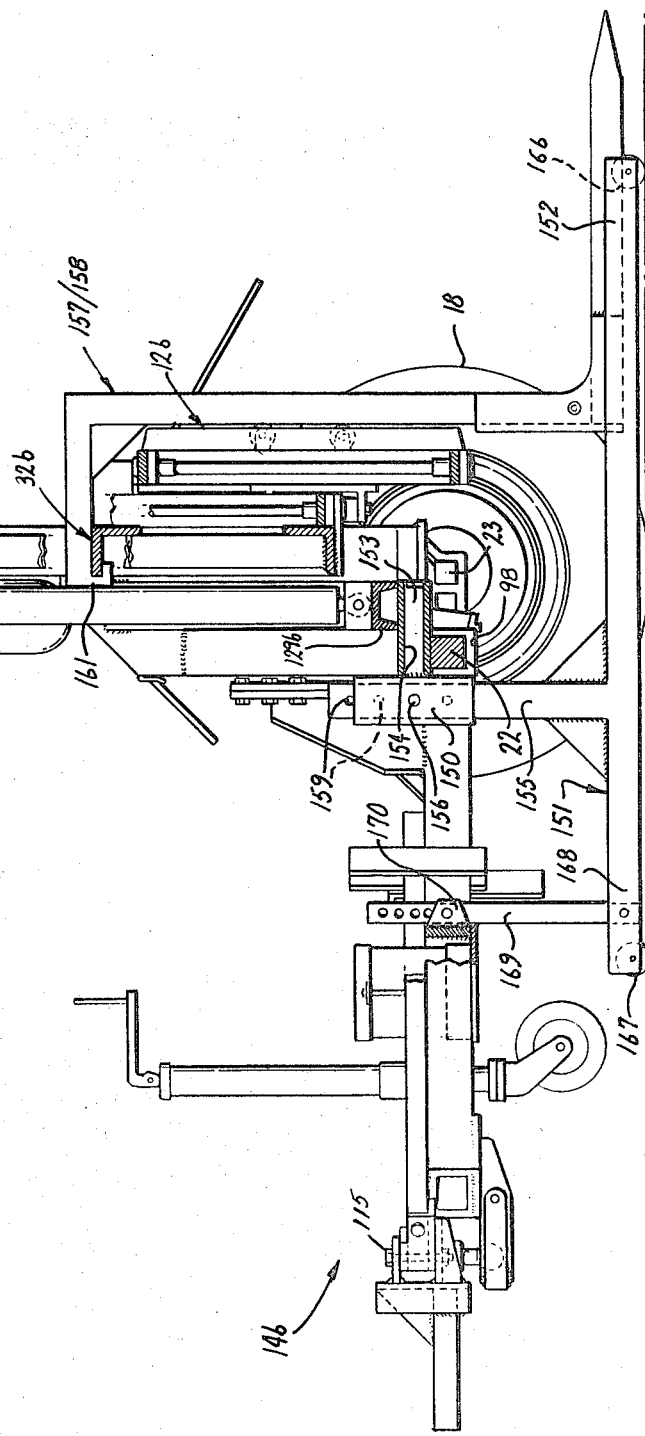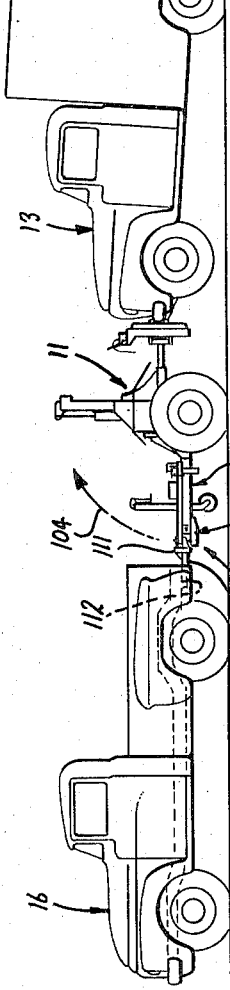

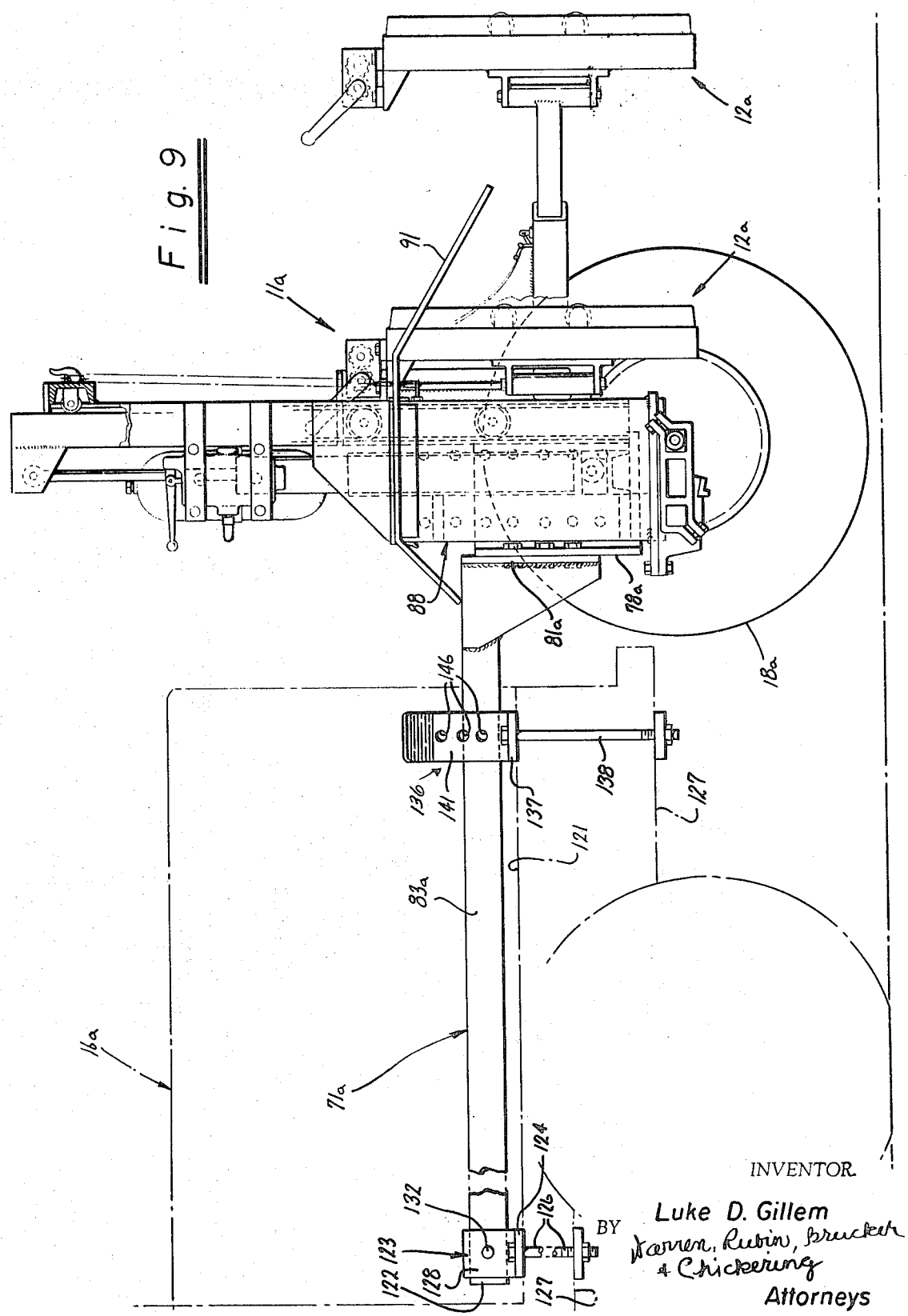

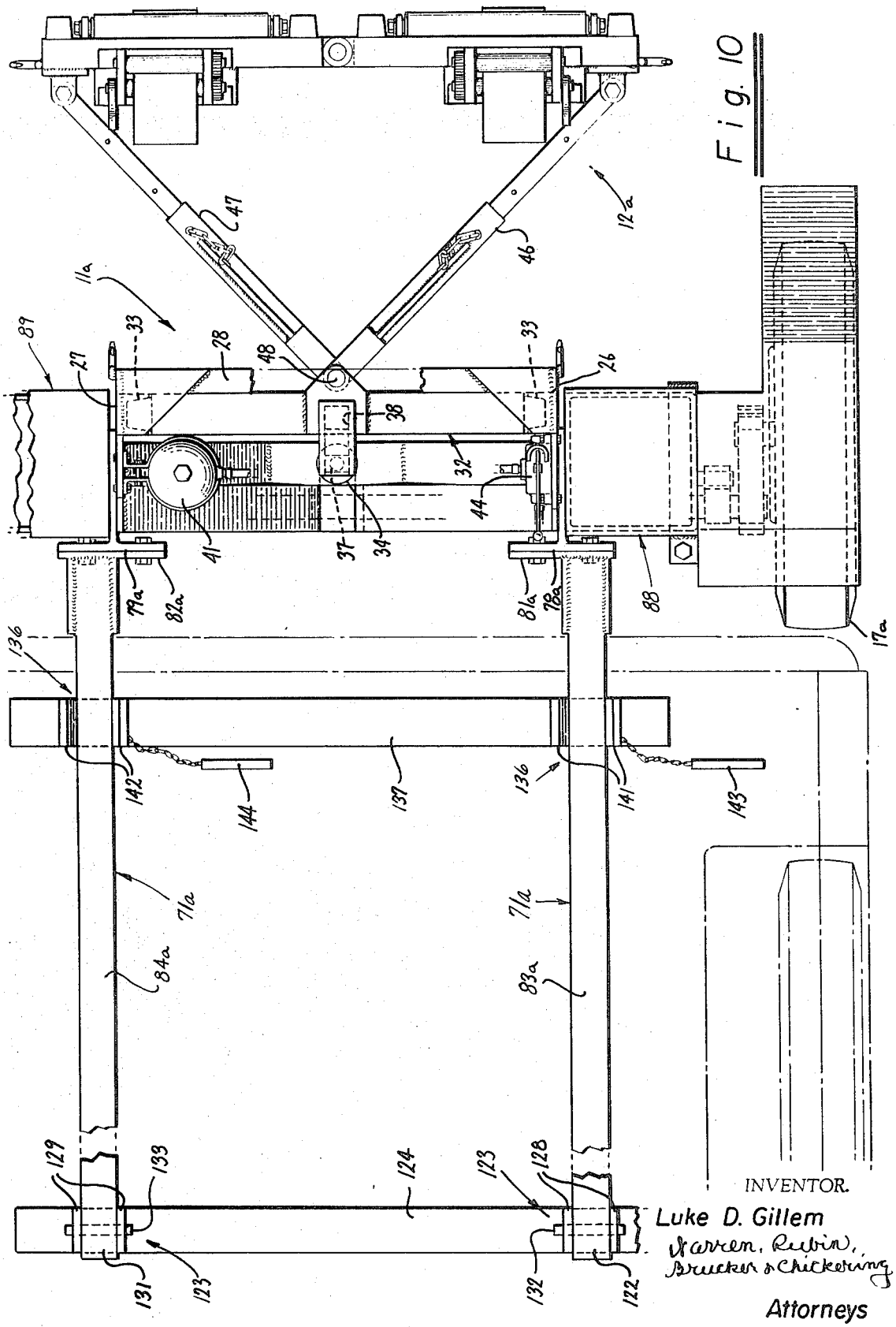

VEHICLE LIFTING AND TOWING APPARATUS

The invention relates to tow truck type vehicles and similar apparatus such as disclosed in U.S. Pat. No. 3,154,205.

One of the major problems in towing apparatus heretofore available has been the severe eccentricity of the load required to be carried by the towing vehicle. Lifting booms or other apparatus for engaging and lifting either the front or rear end of the disabled vehicle need to project far rearwardly of the wheels of the towing vehicle in order to engage and pick up the load of the disabled vehicle. Thus a large torque is placed on the frame of the towing vehicle producing what may be a dangerous overloading of the rear wheels and a lightening of the load on the front wheels, thereby impairing the steering characteristics of the towing vehicle. To counteract these load aberations, towing vehicles are provided with rear overload springs, heavier, and sometimes dual, rear tires and larger rear brakes. Also, the front ends of the vehicles are loaded down with heavy counterweight bumpers.

An object of the present invention is to provide a vehicle lifting and towing apparatus of the character described which will substantially eliminate the need for the above described strengthening and weighting up of the towing vehicle and to enable small size pickup trucks and vehicles to be readily used for the towing of disabled vehicles.

Another object of the present invention is to provide and apparatus of the character above which may be easily and quickly installed and connected to standard commercial vehicles, and with equal ease and facility transferred from vehicle to vehicle, and will enable the vehicle to which it is attached to be operated with ordinary driver skill as a towing vehicle at legal road speeds, with full road traction, sure and precise steering, and ample braking power.

A further object of the present invention is to provide an apparatus of the character above which may be readily converted into a self-contained, roll-about shop lift.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings:

FIG. 1 is a side elevation of a vehicle lifting and towing apparatus constructed in accordance with the present invention.

FIG. 2 is a plan view of the apparatus illustrated in FIG. 1.

FIG. 3 is a cross sectional view taken substantially on the plane of line 3—3 of FIG. 2.

FIG. 4 is a fragmentary cross sectional view of the apparatus.

FIG. 5 is a front elevation of the portion of the apparatus shown in FIG. 4.

FIG. 6 is a cross sectional view similar to FIG. 4 but showing the apparatus attached to the forward end of a disabled vehicle.

FIG. 7 is a side elevation of a portion of the apparatus shown in FIG. 6 and the attached disabled vehicle.

FIG. 8 is a diagrammatic representation of the apparatus of the present invention shown in use with a towing and towed vehicle.

FIG. 9 is a side elevation of a modified form of the apparatus.

FIG. 10 is a plan view of the apparatus illustrated in FIG. 9.

FIG. 11 is a vertical cross sectional view of the apparatus shown in FIGS. 1–8 converted into a portable, roll-about shop lift.

The vehicle lifting and towing apparatus of the present invention comprises briefly a wheel supported carriage 11 for over-the-road movement longitudinally of the carriage; means 12 mounted on the carriage at one longitudinal side thereof for attachment to and raising of a disabled vehicle 13 to be towed; means 14 mounted on the carriage at the opposite longitudinal side thereof for connection to a towing vehicle 16; and wherein the principal load of the disabled vehicle 13 is carried on the carriage wheels 17 and 18 and means 12 provides a vertical hinge 19 for relative articulation between the disabled vehicle and carriage 11.

Carriage 11 is here formed with a frame or chassis 21; an axle 22 which supports wheels 17 and 18 in transversely spaced relation and for rotation about a common transverse axis. Preferably, and as here shown, axle 22 is of the "Linco Level Load" type such as shown in U.S. Pat. No. 2,426,513 and having interconnected offset wheel spindles 23 and being torsionally mounted for interconnected wheel displacement. Such an axle will provide a level load condition which is of importance in towing operations where the ground may be uneven as, for example, in pulling out of ditches, over curbs and the like. The level load type axle 22 also co-functions very well with the fifth wheel pivot provided by hinge 19 in providing improved load handling conditions around curves and uneven terrain which may be encountered in the towing operation.

The carriage chassis 21, as best seen in FIG. 3, comprises a central frame having vertical side members 26 and 27, and top and bottom cross members 28 and 29. A second frame member 32 is carried by side members 26 and 27 for vertical reciprocation, members 26 and 27 here being formed with confronting channel sections for receiving rollers 33 mounted on the opposite ends of frame member 32. Manually controlled power operated means is provided for raising and lowering of member 32 and here comprises a hydraulic cylinder 34 supported at one end to the base side 29 by connection shown at 36, and having a piston shaft 37 projecting from its upper end and connected to the upper end of a vertical center post 38 of frame member 32, see FIG. 1; a hydraulic storage tank 41; a hydraulic pump 42; electric motor 43 connected to pump 42; and a manually controlled multi-position valve 44 appropriately connected to the other parts so as to cause energizing of cylinder 34 for raising and lowering of frame member 32.

Connection of the power driven frame member 32 to the disabled vehicle 13 to be towed here comprises a pair of arms 46 and 47 hinged at one end about a vertical pivot 48 (forming vertical hinge 19) and extending horizontally therefrom; a bumper engaging plate 51 secured on vertical pivots 52 and 53 to the opposite ends of arms 46 and 47; and means, here consisting of straps 56 fitted with hooks 57 at one end for engaging the frame 58 of the disabled vehicle 13, see FIG. 7, and being threaded around rollers 59 carried by bumper plate 51 and secured in take up fasteners 61 mounted on plate 51. For a more detailed showing and description of the foregoing attachment means, reference is made to U.S. Pat. No. 3,154,205.

As an important feature of the present construction, bumper plate 51 is medially hinged at pivot 62 so as to conform in shape to and to fit against forwardly pointed bumpers, such as shown at 63, of disabled vehicles. As here shown, see FIGS. 4, 5 and 6, plate 51 is made up of two frame-like sections 66 and 67 secured on pivot pin 62 for movement through a range of flat to angular positions for accommodating itself to the shape of the bumper 63 on the disabled vehicle. Pads 68 are mounted on the side of sections 66 and 67 opposite to arms 46 and 47 for non-marring engagement with bumper 63.

Means 14 of attachment of the apparatus to the towing vehicle comprises a tow tongue 71 and carriage attachment means therefor providing relative vertical positioning of the tongue on the carriage so as to accommodate the height of the connection 72 to the towing vehicle. Adjustment in vertical height of the tongue connection to the carriage is here provided by T-shaped plate members 73 and 74 having stem plate sections 76 and 77 adjustably secured, as by bolting, to the outside surfaces of frame sides 26 and 27, the T members having front flanges secured, as by bolting, to confronting similarly formed flanges on the ends of side rails 83 and 84 making up tongue 71. As will be best seen from FIG. 2, these rails converge forwardly of the carriage and are secured at their apex between top and bottom plates 86 and 87 (FIG. 1) so as to provide a triangular shaped tow tongue connected at its base to the carriage and at its apex to the towing vehicle.

The carriage assembly here also preferably includes a pair of tool boxes 88 and 89 secured to T-shaped members 73 and 74 and which in turn provide support for fenders 91 and 92 overlying wheels 17 and 18 and for bearings 93 and 94 for axle 22. As is characteristic with the Linco axle aforementioned, helical springs 96 and 97 are mounted on axle 22 and have their opposite ends secured to the axle and to bearings 93 and 94 respectively. As an important feature of the foregoing construction, the adjacent sides of the tool boxes 88 and 89, stem plate sections 76 and 77 of the T members, and frame sides 26 and 27 are provided with a plurality of sets of bolt openings so as to provide for bolting of these parts together with a range of vertical adjustment of the T-shaped plate members. Similarly, the confronting flanges 78 and 79 of the T members and 81 and 82 of the tongue rails are formed with a plurality of sets of bolt openings to provide final vertical height adjustment of the tow tongue. Thus, the apparatus is adjustable for use with a wide range in heights of towing connections 72 on the towing vehicle. As will also be seen from FIG. 2, flanges 81 and 82 are angularly related with respect to rails 83 and 84 for face-to-face engagement with flanges 78 and 79. Preferably, also, and as here shown in FIG. 3, the base side 29 of the carriage frame is fitted by bracket 98 with a socket (square tube) 154 for receipt of a trailer hitch (not shown) or shop stand 151, see FIGS. 3 and 11. A manually height adjustment caster wheel assembly 99 is mounted on the tow tongue for supporting the carriage for roll-about movement when not attached to the towing vehicle. Normally the caster wheel will be removed during towing operation. A battery 101 is also carried on the tongue for powering electric motor 43, lights, brakes and the like so that the unit is self-contained with respect to its power source. Battery 101 can be connected to the alternator of the towing unit for recharging when so connected.

One of the problems in conventional towing operations is the very large amount of weight in motion occasioned by the addition of the weight of the disabled vehicle to the weight of the towing vehicle. Normally installed braking systems are inadequate to provide controlled stopping of the moving pair of vehicles with the degree of safety desired. Advantage is taken in the present invention of the extra pair of load supporting wheels 17 and 18 to increase the braking power of the moving train of vehicles. As here shown, both wheels 17 and 18 are fitted with brakes 102 and 103 so as to have six braking wheels on the ground, or an increase of about 50 percent over the normal braking power of the towing vehicle. Brakes 102 and 103 are preferably electrical in their actuation and are controlled by a rheostat foot control attached to the brake pedal of the towing vehicle so as to apply the carriage brakes simultaneously with the brakes of the towing vehicle.

Connection of the tow tongue 71 to the towing vehicle cannot be accomplished as in the case of the usual trailer since tow tongue 71 is subjected to a high rotating moment, indicated by arrow 104 in FIG. 8, due to the axially offset mass of disabled vehicle 13, thus placing a lifting action on the forward end 106 of the tongue. It is important that forward end 106 be connected to the towing vehicle in an articulated joint 107 so as to provide better handling of the vehicle train around corners and over uneven terrain. However, in the present case the reversal of force at end 106, i.e., a vertical thrust instead of the usual downward thrust, makes the ordinary ball and socket trailer hitch unsuitable for use at this point. Also, because of the acting moment 104 and upper thrust on tongue end 106, the rear wheels of towing vehicle 16 would be raised from the roadway due to the load of disabled vehicle 13 so as to render the towing vehicle inoperable. I have overcome the above problems and at the same time provided important advantages by first inverting the customary orientation of the ball and socket trailer hitch so that the socket member 108 applied to the forward end 106 of the tongue will bear upwardly against an inverted ball 109 carried by section 111 integrally secured to the chassis frame connecting part 72 of the towing vehicle. Of importance in the present invention, part 72 is connected integrally with the frame 112 of the towing vehicle. Secondly, means 113 is provided in spanning relation across the ball and socket joint to restrain the upward bowing of this joint so that the upward thrust of the trailer tongue is transferred to the longitudinal frame 112 to counteract the lifting action of the disabled vehicle on the rear end of the towing vehicle. The construction as described will permit the use of ordinary passenger vehicles for picking up and towing very heavy disabled vehicles.

It is also desirable that the restraining of the upward bowing of the articulated joint 107 be accomplished with resilient action and, accordingly, means 113 here comprises an elongated spring member which is connected at one end 114 to section 111 and at its other end 116 to tongue 71 in spaced relation to ball socket section 108; and since articulation is to be restrained rather than prevented, the forward end 114 of the spring member is connected to section 111 for relative rotary displacement about a vertical axis, and the connection of spring member end 116 to the tow tongue provides for relative longitudinal displacement between the spring member and tongue. I have found that a useful anti-sway function can be additionally provided by using a pair of spring members 113 and 113a having forward ends 114 and 114a journaled in section 111 by pins 115 and 115a on opposite sides of and for rotation about axes parallel to the vertical axis of the ball and socket joint 107; and diverging members 113 and 113a rearwardly in parallel relation to tongue rails 83 and 84 and securing the rearward ends 116 and 116a of the spring members in brackets 117 and 118 carried by rails 83 and 84, the spring ends being held down in the brackets but permitted longitudinal sliding action therein. It will thus be seen that pressing down on spring ends 116 and 116a will exert a counter rotating force around ball joint 107 to effect a resilient preloading of the structure. Preferably, and as here shown, brackets 117 and 118 are formed to provide adjustment in the spacing between spring ends 116–116a and the tongue to thereby provide selective preloading of the spring members Each bracket here comprises a rigidly set vertical rail 117a upon which is mounted for vertical reciprocation a spring retaining section 117b. A bolt 117c may be mounted thru any of a plurality of spaced registering openings 117d in the rail and section for adjustably securing the spring retaining section in selected vertical position on the rail. Normally sections 108 and 111 will be factory assembled to provide desired preloading upon fastening of spring members 113–113a into brackets 117–118. As will be observed, these spring members may be swung about their pivoted forward ends into and out of the brackets. Contrary to the usual trailer hitch construction, the entire ball and socket joint 107 and section 111 are preferably permanently connected and remain with the carriage 11. Section 111 is here formed with a forwardly extending shank 119 for demountable telescopic attachment to frame connecting part 72 of the towing vehicle. Thus the carriage may be used with any of a plurality of towing vehicles having telescopic frame part 72 located at a predetermined elevation for receiving sections 111. Spring members 113–113a will be released from brackets 117–118 prior to attachment of sections 72 and 111, and be similarly detached prior to removal of sections 111 from part 72. As will be seen in FIGS. 1 and 2 the forward ends 114 and 114a of spring members 113 and 113a are secured, as by pins 120 and 120a, in channel shaped hinge pieces 125 and 125a which are in turn secured to section 111 by vertical hinge pins 115 and 115a. Accordingly, downwardly applied force to the opposite, forward, ends 116 and 116a of spring members 113 and 113a will cause a rocking of the ball and socket joint 107 and section 111 in a clockwise direction, as seen in FIG. 1, and an elevation of shank 119. However, with shank 119 telescopically engaged with frame part 72 of the towing vehicle, the forgoing moment is resisted by the entire weight of the towing vehicle. Since the lever arm distance between the center of mass of the towing vehicle and wheels 17 and 18 (functioning as a fulcrum) is very much greater than the lever arm distance between the wheels and the forward end of the disabled vehicle being towed, a relatively lightweight towing vehicle may easily pick up one end, and tow, a very much heavier disabled vehicle.

A modified form of the invention, as illustrated in FIGS. 9 and 10, wherein the apparatus is constructed for use with a tow truck 16a having a truck bed 121 and wherein the tow tongue 71a is connected to carriage 11a to extend from the side thereof opposite to the means 12a for connection to and picking up of the disabled vehicle, and having a free end portion 122 at an elevation positioned to overlie truck bed 121; and means 123 pivotally mounting tongue end 122 on the truck bed for relative rotational displacement of the tongue about a horizontal axis. Preferably, the tow tongue is constructed with a pair of elongated forwardly extending beam members 83a and 84a which are fitted at their carriage attaching ends with flanges 81a and 82a for face-to-face bolting to flanges 78a and 79a on the carriage mounted T-shaped plate members as in the above described embodiment in order to provide vertical adjustment in the height of the tongue members 83a and 84a. In this embodiment, however, it will be noted that these tongue members project longitudinally forwardly of the carriage in parallel relation rather than the converging relation as in the first embodiment. Mounting means 123 for the forward ends of tongue members 83a and 84a here comprises a strap 124 preferably secured, as by bolts 126, to the frame 127 of the truck; pairs of upstanding ears 128 and 129 fixed to the upper side of strap 124 and forming sockets for the forward ends 122 and 131 of members 83a and 84a; pivot pins 132 and 133 threaded through transversely aligned openings in ears 128–129 and ends 131 and 122 thereby pivoting the tongue members about a common horizontal axis, see FIG. 10.

As a feature of this modified form of the invention, means 136 is provided for supporting a mid-portion of the tow tongue on bed 121 at selective elevations of the tongue to thereby determine the relative elevation of carriage 11a and the distribution of load between the suspension systems for the truck and carriage. This feature enables a complete lifting of the wheels 17a and 18a of the carriage from the road when the pickup means 12a is not loaded and the towing vehicle is en route to the disable vehicle, thus eliminating wear on the carriage tires and suspension system and incidentally avoiding the additional charge sometimes made by toll authorities for tandem axle vehicles. Also, the truck suspension systems are designed for operating under load and preliminary elevation of carriage 11a from the ground will ensure the application of a minimum load to the truck suspension system when the disabled vehicle is picked up. This loading should be in the order of 500 to 1,000 pounds which will properly load the towing vehicle for proper operation of its suspension system and traction of its rear driving wheels. The balance of the load of the disabled vehicle will be carried by the carriage wheels 17a and 18a.

Means 136 here comprises a strap 137 positioned crossways on the truck bed adjacent its rear end and which is secured as by bolts 138 to the truck frame 127, and pairs of upstanding ears 141 and 142 fixed to strap 127 on opposite sides of and forming a vertical socket for tongue members 83a and 84a. Thus, while the tongue members 83a and 84a are confined by ears 141–142 against transverse movement, they are free to oscillate vertically within the sockets provided by the ears and about pivots 132 and 133 at their free ends. The mounting height of members 83a and 84a at the carriage will thus determine the amount of preloading placed on the truck before the carriage 11a picks up its share of the load of the disabled vehicle. In addition, and to meet unusual conditions, there is provided in the ears 141–142 a plurality of horizontally aligned vertically spaced openings 146 and which may receive pins 143, 144 to underlie members 83a and 84a, to adjust the preloading height of the carriage as may be desired for increasing the traction on the truck rear drive wheels.

A further modified form of the invention is illustrated in FIG. 11 wherein the preferred form of the invention, as illustrated in FIGS. 1–8, is selectively modified to produce a piece of general utility load lifting shop equipment. This is accomplished by providing a demountable shop stand, here in the form of a ground engaging lever 151 which may be demountably secured to the carriage, and is constructed to extend therefrom to the same side of the wheel axis as lift member 12b and which is provided with a ground supported portion 152 spaced from such axis to support the rotational moment presented by loaded member 12b. Member 151 is here of generally inverted T shape having lateral arm 153 adapted for insertion in socket 154 provided at the base 129b of the carriage frame. Preferably arm 153 is carried by a sleeve 150 telescopically mounted on the stem 155 of the T-shaped member to provide vertical adjustment. Sleeve 150 and stem 155 are held in selected position by pin 156 mounted through aligned height adjustment openings 159. As here shown a vertical brace 169 is connected adjacent end 168 and is secured in a bracket 170 carried by rails 83 and 84. Caster wheels or rollers 166 and 167 are desirably provided at the opposite ground engaging ends 152 and 168 to facilitate rolling about and positioning of the apparatus.

The lift frame 32b may be converted to general lift application by the attachment thereto of fork members 157 and 158 which are here formed with upper hook or bracket portions 161 for engaging over and connection to the top side of frame member 32b. In this form of the invention, the tongue 14b may be manually engaged for movement about of the apparatus while lever 151 will provide complete stability of the apparatus in load bearing condition.

I claim:
1. In a vehicle lifting and towing apparatus having a wheel supported carriage for over-the-road movement longitudinally of said carriage, and a member on one longitudinal side of the carriage mounted for vertical reciprocation and for attachment to and raising of a vehicle to be towed, and a tow tongue on the opposite side of said carriage for connection to a towing vehicle; the improvement comprising:
   a pair of arms secured about a vertical axis pivotal joint to said member and providing articulation between the towing and towed vehicles, said arms diverging horizontally from said pivotal joint;
   a bumper engaging plate having horizontally spaced vertical axis pivotal connection joints to the divergent ends of said arms and having means for securing said plate to the bumper of the vehicle to be towed; and
   said plate being sectionalized with a vertical axis medial hinge cofunctioning with the aforesaid pivotal joints to cause sections of said plate to conform in shape to and to fit against forwardly pointed bumpers.

2. In a vehicle lifting and towing apparatus having a wheel supported carriage for over-the-road movement longitudinally of said carriage, and a member on one longitudinal side of the carriage mounted for vertical reciprocation and for attachment to and raising of a vehicle to be towed, and a tow tongue on the opposite side of said carriage for connection to a towing vehicle; the improvement comprising:
   a frame supporting said member for vertical reciprocation;
   a pair of tool boxes and tongue mounting plates secured to opposite sides of said frame and for adjustable vertical positioning of said plates, said plates having angularly related flanges; and
   said tow tongue having parts demountably secured for adjusted vertical positioning to said flanges.

3. An apparatus as defined in claim 2,
   axle bearings mounted on said boxes;
   an axle journaled in said bearings and having offset wheel spindles;
   wheels journaled for rotation on said spindles; and
   spring torsionally connecting said axle and bearings.

4. In a vehicle lifting and towing apparatus having a wheel supported carriage for over-the-road movement longitudinally of said carriage, and a tow tongue on one longitudinal side of said carriage for connection to a towing vehicle having a rigid frame, and a member on the opposite side of said carriage mounted for vertical reciprocation and for attachment to and raising of a vehicle to be towed thereby imparting a rotating moment to said carriage and upward thrust of said tongue, the improvement comprising:
   a rigid part formed for demountable securing to said towing vehicle frame;
   a universal bearing joint connecting said part and tongue and comprising an upward thrust bearing section mounted on said tongue and a complementary downwardly oriented thrust bearing section on said part; and
   an elongated spring member connecting said part and tongue and restraining upward bowing of said joint and transferring said upward thrust to said frame.

5. An apparatus as defined in claim 4 wherein said sections are articulated for relative rotation about a vertical axis, and including:
   a pair of said spring members;
   means journaling one end of each of said spring members to said part on opposite sides and for rotation about axes parallel to said first named axis; and
   means mounting the opposite ends of said spring members on said tongue for relative longitudinal displacement therebetween upon articulation of said sections.

6. An apparatus as defined in claim 5, said last named means providing selective spacing of said spring member ends and tongue for selective preloading of said spring members.

* * * * *

UNITED STATES PATENT OFFICE
CERTIFICATE OF CORRECTION

Patent No. 3,779,407         Dated December 18, 1973

Inventor(s) Luke D. Gillem

It is certified that error appears in the above-identified patent and that said Letters Patent are hereby corrected as shown below:

Column 5, line 27, after "members" add --.--.

Column 6, line 63, change "127" to --137--.

Signed and sealed this 23rd day of April 1974.

(SEAL)
Attest:

EDWARD M.FLETCHER,JR.　　　　　　　　C. MARSHALL DANN
Attesting Officer　　　　　　　　　　　Commissioner of Patents